United States Patent [19]

Sherman

[11] 4,085,960
[45] Apr. 25, 1978

[54] TILTING CAB LATCH MECHANISM

[75] Inventor: Clarence A. Sherman, Birmingham, Mich.

[73] Assignee: Terry McDermid, Southfield, Mich.

[21] Appl. No.: 691,278

[22] Filed: Jun. 1, 1976

[51] Int. Cl.$^2$ .............................................. B62D 27/06
[52] U.S. Cl. .............................. 296/28 C; 180/89.13; 292/144; 296/35 R
[58] Field of Search ........................... 296/28 C, 35 R; 180/89.12, 89.13, 89.14, 89.15; 292/302, 144

[56] References Cited

U.S. PATENT DOCUMENTS

| | | | |
|---|---|---|---|
| 3,497,257 | 2/1970 | Hirst | 296/35 R |
| 3,581,840 | 6/1971 | Hirst | 180/89.14 |
| 3,624,761 | 11/1971 | Kohn | 292/144 |
| 3,751,086 | 8/1973 | Geringer | 292/144 |
| 3,825,295 | 7/1974 | Saunders | 296/35 R |
| 3,973,793 | 8/1976 | Hirst | 292/144 |
| 4,022,509 | 5/1977 | Bopp | 292/144 |

Primary Examiner—Joseph F. Peters, Jr.
Assistant Examiner—John A. Carroll
Attorney, Agent, or Firm—Reising, Ethington, Barnard, Perry & Brooks

[57] ABSTRACT

A latch mechanism for a tilting cab vehicle selectively secures a cab thereof to the vehicle frame in a lower use position against movement to an access position. The latch mechanism includes a keeper preferably mounted on the cab and a base preferably mounted on the frame. A keeper opening of the base receives the keeper upon movement of the cab to the use position. The mechanism also includes a bolt mounted on the base for movement between a latching and a nonlatching position so as to selectively engage and disengage the keeper within the keeper opening to maintain the cab in the use position. A hydraulic cylinder mounted on the base defines a cylinder bore and includes a piston slidable within the bore. A first side of the piston includes a connecting rod portion that fixedly mounts the bolt such that sliding of the piston moves the bolt between its two positions. A first end of a helical spring is seated against a cylinder end wall within the bore and a second end thereof is seated against the second side of the cylinder so as to bias the piston in a direction that moves the bolt to the latching position. Hydraulic fluid is supplied to the cylinder bore on the first side of the piston so that the fluid acts against the bias of the spring to move the piston such that the bolt is moved to the nonlatching position.

15 Claims, 4 Drawing Figures

TILTING CAB LATCH MECHANISM

BACKGROUND OF THE INVENTION

1. Field of the Invention

The present invention relates to a latch mechanism for use with a tilting cab vehicle to secure an occupant cab in a use position against movement toward an access position where the vehicle engine is accessible for maintenance or repair, and particularly to such a mechanism in which the latching action is controlled by a cylinder operated by a pumped fluid.

2. Description of the Prior Art

The United States Patent of Nordell et al 3,752,519 discloses a latch mechanism for selectively securing a tilting cab of a vehicle in its lower use position against movement to an upper access position. This latch mechanism includes a hook-shaped bolt pivotally mounted on a connecting rod of a hydraulic cylinder piston that moves the bolt vertically to provide latching and unlatching of the mechanism. Cam surfaces of the mechanism provide pivotal bolt movement as it is moved vertically for unlatching and as it is moved vertically in an opposite direction by a spring bias for latching.

Other latch mechanisms having latching action that is controlled by fluid cylinders are disclosed by the following U.S. Pat. Nos. referenced in the aforementioned Nordel et al patent: Messick 1,038,624; Schneider 1,342,465; and Stribling 3,169,472.

SUMMARY OF THE INVENTION

The present invention relates to an improved tilting cab vehicle latch mechanism whose latching action is controlled by a fluid cylinder.

The latch mechanism includes a keeper and a base, with the keeper preferably designed to be mounted on a tilting cab, and with the base preferably designed to be mounted on the associated vehicle frame. A keeper opening in the base receives the keeper as the cab is moved to its use position and a bolt mounted on the base moves from a nonlatching position to a latching position under the control of the fluid cylinder to engage the keeper and thereby retain the cab in position. The fluid cylinder defines a cylinder bore that receives a slidable piston having a first side including a connecting rod portion that fixedly supports the bolt. An end wall of the cylinder seats the first end of a helical spring whose second end is seated against a second side of the piston so as to normally bias the piston in a direction that moves the bolt to the latching position. Pumped fluid is supplied to the cylinder bore on the first side of the piston to overcome the spring bias and move the piston in a direction that moves the bolt to its nonlatching position out of engagement with the keeper so as to release the cab for movement to its access position.

A bolt aperture through the keeper moves into alignment with bolt openings in the base on opposite sides of the keeper opening as the cab moves to its use position. During movement to the latching position, the bolt moves from one of the bolt openings in the base through the bolt aperture in the keeper and into the other bolt opening in the base. To insure that the keeper is fully received within the keeper opening in the base, the bolt and the bolt aperture in the keeper have tapered shapes that wedge the keeper into position on the base. The tapered shapes of the bolt and the keeper aperture are preferably frustoconical with the smaller end of the bolt moving initially into the aperture in the keeper. Proper positioning of the cab as it moves to the use position is insured by complementary tapered shapes of the keeper and the keeper opening in the base. The keeper preferably has four sides that taper in a generally pyramidal fashion with two of the sides closer to each other than the other two so as to be of a flattened configuration. The bolt aperture of the keeper extends through the keeper between the two closer sides so that the bolt passes through the thinner extent of the keeper in the latching position.

Plate-like mounting portions of the keeper and the base provide for mounting of these components on the vehicle cab and frame, respectively. Each of the mounting portions include elongated mounting bolt holes that permit adjustment for aligning the cab in the proper location on the frame. The elongated extent of the bolt holes on the keeper is perpendicular to the elongated extent of the bolt holes on the base so as to facilitate this alignment.

In the preferred embodiment disclosed, the bolt is integrally supported by the connecting rod portion of the cylinder piston. A second helical spring may be utilized to cooperate with the other helical spring in biasing the piston to move the bolt to the latching position. Two such springs are disclosed with one spring encircling the other. First ends of the springs are seated against the end wall of the cylinder and second ends thereof are received within a depression in the second side of the piston. The depression extends through the connecting rod portion of the piston and has a reduced end portion that seats the second end of the smaller encircled spring to locate it with respect to the larger spring whose second end is seated by an annular ledge of the depression. As the springs are compressed and extended during bolt movement between the latching and nonlatching positions, a vent to the cylinder bore on the second side of the piston provides for air flow to and from the cylinder bore.

Tilting cab vehicles of the type with which the latch mechanism is utilized incorporate hydraulic actuators that are supplied pump fluid of a predetermined pressure to move the cab from its use position to its access position. The bias of the helical spring or springs of the latch mechanism is less than the bias of the hydraulic fluid acting on the piston with the predetermined pressure sufficient to initially cause the actuator to move the cab toward its use position. Consequently, the latch mechanism may be connected to the same pump as the actuator for raising the cab and unlatching of the mechanism then automatically takes place before movement of the cab toward its access position begins.

The objects, features and advantages of the present invention are readily apparent from the following detailed description of the preferred embodiment taken in connection with the accompanying drawings.

DETAILED DESCRIPTION OF THE PREFERRED EMBODIMENT

Figure 1:
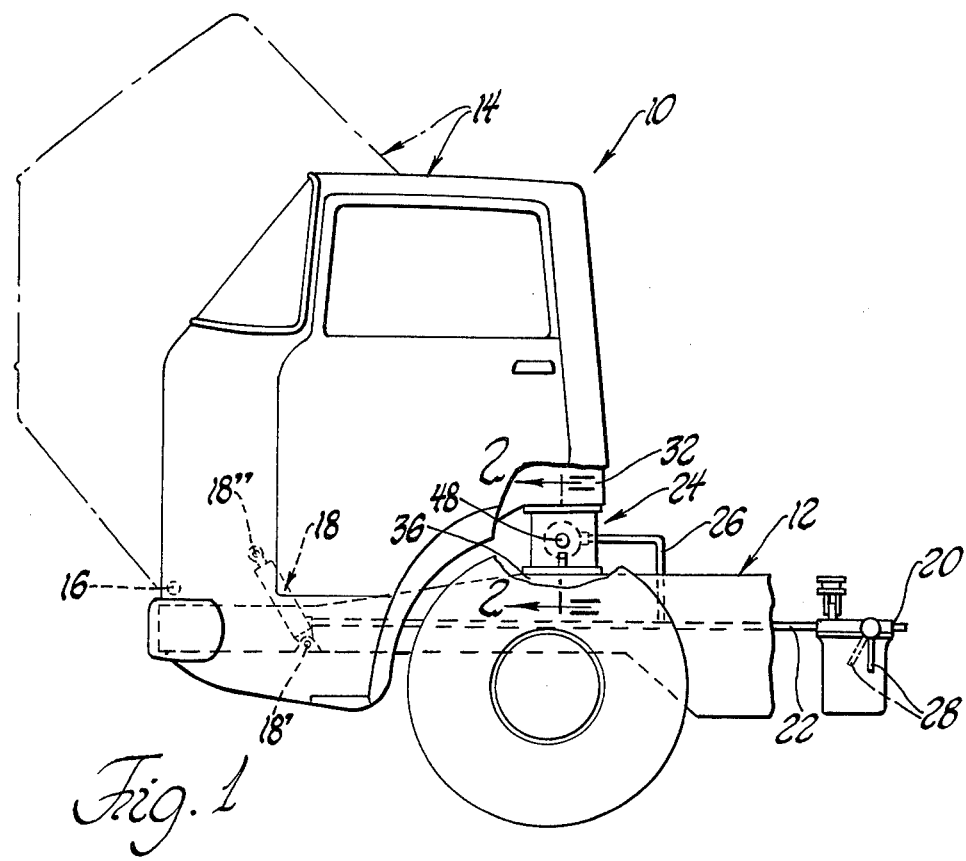
FIG. 1 is a side elevation view of a tilting cab vehicle that incorporates a latch mechanism constructed according to the present invention.

Referring to FIG. 1 of the drawings, a tilting cab vehicle generally indicated by 10 includes a frame 12 and a tilting passenger cab 14 mounted on the frame by a transverse pintle 16. An actuator 18 in the form of a hydraulic cylinder has one end 18' connected to the frame 12 and another end 18" connected to the cab 14. Extension of the actuator 18 moves the cab 14 upwardly from the solid line indicated use position about pintle 16 to the phantom line indicated access position so as to allow maintenance or repair of an unshown vehicle engine. Hydraulic fluid is supplied to the actuator 18 by a pump 20 through a conduit 22. While in the use position shown, a latch mechanism 24 constructed according to the present invention is utilized to secure the cab against movement toward the access position. Latch mechanism 24 is supplied hydraulic fluid through a conduit 26 fed from conduit 22 so as to automatically release the latch mechanism in a manner that is more fully hereinafter described.

Although only one cylinder actuator 18 and latch mechanism 24 are shown in the drawings, it should be understood that there are preferably two actuators and latch mechanisms respectively associated with opposite lateral sides of the vehicle to provide smooth movement of the cab to its upper access position as well as secure retention of the cab in its lower use position. Also, the hydraulic actuator 18 shown is embodied as a "single acting" cylinder and fluid pumped thereto causes its extension while the bias of gravity acting on the cab causes the cylinder retraction as the cab is lowered. Consequently, a suitable stop must be provided so the center of gravity of the cab does not move forward of the pintle 16 as the cab is raised. After raising of the cab, control valve handle 28 of the pump 20 is selectively moveable to exhaust the fluid pressure supplied to the cylinder actuator 18 such that the bias of gravity moves the cab to its lower use position for retention by the latch mechanism. However, it should be understood that the latch mechanism may also be utilized with a "double acting" cylinder actuator that is driven by pumped fluid in both its extending and retracting directions. The center of gravity of the cab may then move forward of the pintle 16 as the cab moves to the access position. If such is the case, the pump 20 is connected to this actuator by suitable conduits so that the hydraulic fluid from the pump drives the cab from its access position to its use position as well as from its use position to its access position. This driving in both directions is necessary due to the manner in which the center of gravity of the cab moves forwardly and rearwardly over the pintle about which the cab tilts.

Latch mechanism 24 includes a keeper 30 mounted on a body member 32 of the tilting cab and a base 34 mounted on a frame member 36 of the associated vehicle frame. Keeper 30 and base 34 include respective plate-like mounting portions 38 and 40 that are secured to their associated vehicle members by attachment bolts 42. The positioning of the keeper and the base on their associated members is such that the keeper is received within a keeper opening 44 of the base as the tilting cab is moved to its lower use position. Elongated bolt holes 46 in the keeper and base mounting portions 38 and 40 receive the attachment bolts 42 in a manner that permits the keeper and the base to be positioned so as to provide proper alignment of the keeper with the keeper opening 44 of the base. As seen by combined reference to FIGS. 2-4, the elongated bolt holes 46 of the keeper mounting portion 38 extend in a lateral direction with respect to the vehicle while the elongated bolt holes 46 of the base mounting portion 40 extend longitudinally with respect to the vehicle in a perpendicular relationship to the elongated bolt holes of the keeper mounting portion. Consequently, side to side adjustment of the keeper and front to rear adjustment of the base is possible to insure proper alignment of the keeper with the keeper opening in the base.

Figure 2:
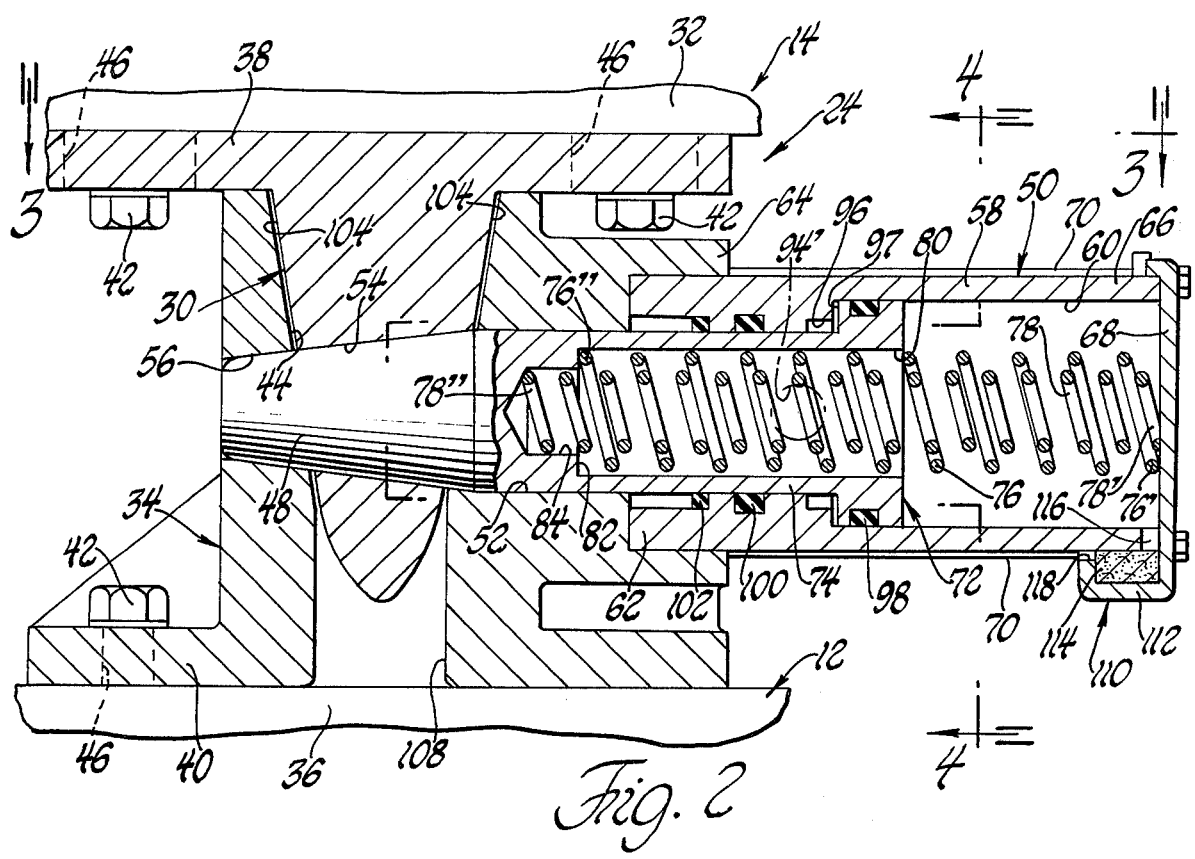
FIG. 2 is a sectional view of the latch mechanism taken approximately along line 2—2 of FIG. 1.
Figure 3:
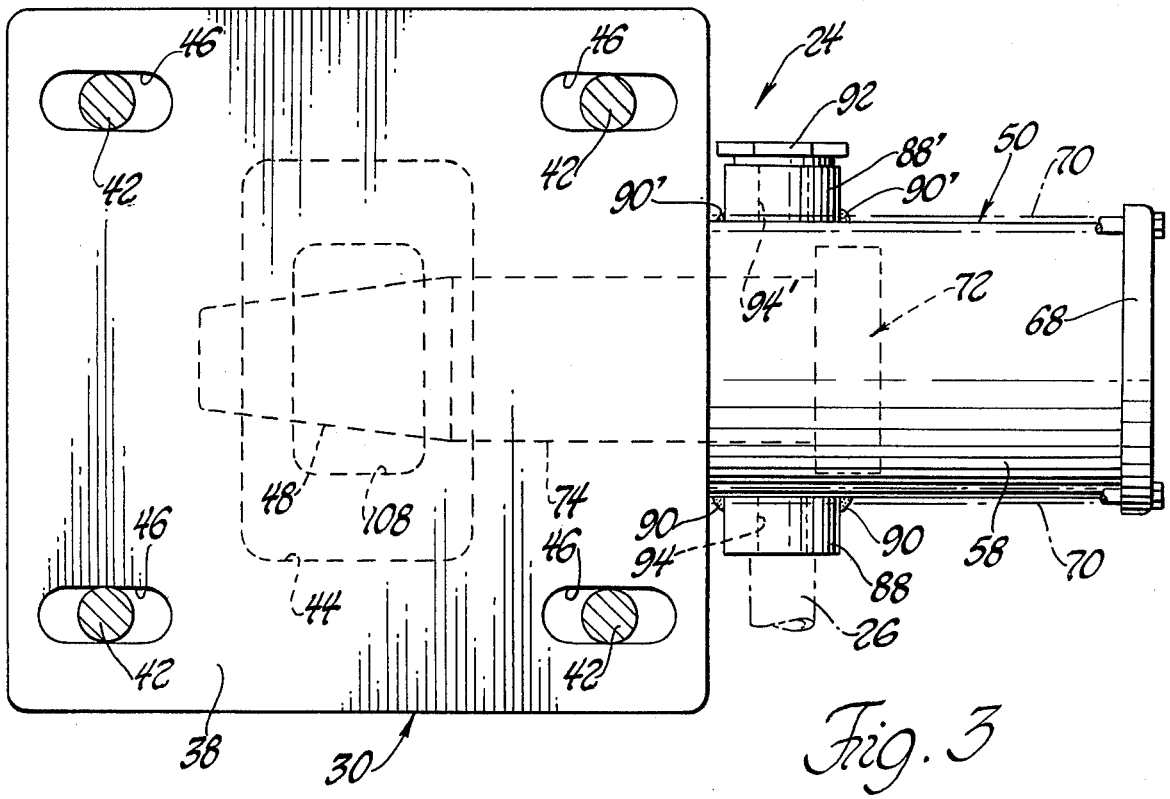
FIG. 3 is a top plan view of the latch mechanism taken approximately along line 3—3 of FIG. 2.

As seen in FIG. 2, a latch bolt 48 of the latch mechanism is controlled by a hydraulic fluid cylinder 50 to selectively retain the keeper 30 within the keeper opening 44 of the base so as to latch the tilting cab in its lower use position. In the latch position shown, the bolt 48 extends from a bolt opening 52 in the base on one side of the keeper opening 44 through a bolt aperture 54 in the keeper and into a bolt opening 56 on the other side of the keeper opening from the bolt opening 52. Upon suitable actuation of the hydraulic cylinder 50 in a manner that is more fully hereinafter described, the bolt 48 is moved to a nonlatching position to the right of a latching position shown in FIG. 2. Bolt 48 is located within the bolt opening 52 in the nonlatching position where it is retracted from the bolt opening 56 in the base and from the bolt aperture 54 in the keeper so as to allow the keeper to move upwardly and permit the cab to move to its access position.

Figure 4:
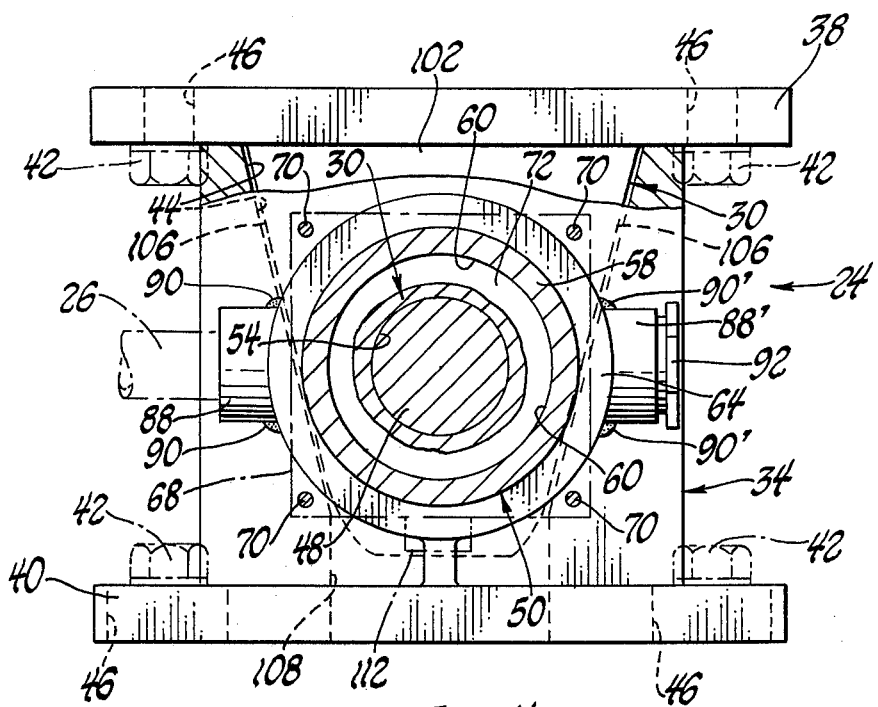
FIG. 4 is an elevation view of the latch mechanism taken in section along line 4—4 of FIG. 2.

With combined reference to FIGS. 2 and 4, the hydraulic cylinder 54 controlling movement of latch bolt 48 includes an elongated housing 58 with a cross section that is round and hollow so as to define a cylinder bore 60. One end 62 (FIG. 2) of housing 58 is received within an annular flange 64 (FIGS. 2 and 3) of the base 34 mounted on the vehicle frame. The other housing end 66 is engaged by a cylinder end wall 68 which has a square shape as seen in FIG. 4. Relatively long attachment bolts 70 extend through the corners of the cylinder end wall 68 along the cylinder housing 58 and are threaded into the base 34 so as to secure the cylinder in position on the base. A round piston 72 of the hydraulic cylinder is slidable in a sealed relationship within the cylinder bore toward and away from the keeper 30 in a lateral direction with respect to the vehicle. Piston 72 has a first side including a connecting rod portion 74 that extends toward the keeper and fixedly supports the bolt 48 in an integral relationship. A second side of the piston 72 faces toward the end wall 68 of the cylinder in an opposite direction to the first side. Large and small diameter helical springs 76 and 78, FIG. 2, are located within the cylinder bore 60 on the second side of piston 72 with spring 76 encircling spring 78 in a coaxial relationship. First ends 76' and 78' of the springs are seated against the cylinder end wall 68, and the springs extend from the end wall toward the piston 72 to be received within a round depression 80 in the second side of th piston. Depression 80 extends into the connecting rod portion 74 of the piston with a diameter that is just slightly larger than the large diameter spring 76 so as to position this spring. An annular ledge 82 of the depression seats a second end 76" of spring 76, while a reduced size end portion 84 of the depression seats a second end 78" of the smaller diameter spring 78 so as to position the smaller spring within the larger spring. Springs 76 and 78 bias the piston 72 toward the left as viewed in FIG. 2 so that the latch bolt 48 is normally positioned in the latching position shown.

With combined reference to FIGS. 1-4, the conduit 26 that feeds hydraulic fluid to the latch mechanism from the pump 20 shown in FIG. 1 is connected to a fitting 88 suitably secured to the rear side of the hydraulic cylinder 50 such as by welds 90. A similar fitting 88' is also suitably secured to the front side of the cylinder such as by welds 90' but is closed by a plug 92. The second fitting 88' permits the cylinder to be connected to a fluid conduit from the opposite side as the conduit 26 shown. Thus, with two latch mechanisms 24 associated with opposite sides of the vehicle as previously discussed, each latch mechanism may have its associated hydraulic cylinder 50 extending inwardly while still being connected to a fluid conduit from the rear. Fittings 88 and 88' include respective fluid ports 94 and 94', FIG. 3, that are communicated with the cylinder bore 60 on the first piston side which includes the connecting rod portion 74. The fluid communication of the ports with the cylinder bore is at a reduced diameter cylinder bore portion 96 (FIG. 2) adjacent the left-hand end of the bore. Hydraulic fluid supplied to the cylinder bore portion 96 acts on an annular surface 97 of the second piston side against the bias of springs 76 and 78 to move the piston to the right and thereby move the latch bolt 48 to its nonlatching position so as to release the keeper 30. An annular seal 98 of the piston provides sealing between the piston and the cylinder bore 60, while a pair of annular seals 100 and 102 provide sealing between the cylinder housing 58 and the piston connecting rod portion 74.

When an operator desires to raise the cab 14 from its solid line use position of FIG. 1 to its phantom line access position, the handle 28 of pump 20 is positioned to feed hydraulic fluid to the conduit 22 as the pump is operated. The bias of springs 76 and 78 (FIG. 2) is less than the bias of the fluid acting on the piston 72 with a sufficient pressure so that the fluid actuator 18 (FIG. 1) can raise the cab. Consequently, the piston 72 slides to the right as viewed in FIG. 2 so as to automatically move the bolt 48 to its nonlatching position before the fluid actuator 18 begins to tilt the cab 14 upwardly. With the cab sitting idle in its raised position, the cab center of gravity is just rearward of a vertical line through the pintles 16. As such, there is a relatively small torque biasing the cab downwardly and the fluid pressure generated thereby is not sufficient to maintain the bolt 48 in its nonlatching position against the bias of springs 76 and 78. Subsequent to completion of maintenance or repair of the vehicle engine, the pump handle 28 is moved to allow the fluid to return to the pump through its orifice as previously mentioned. The cab then moves downwardly under gravity at a controlled rate and its center of gravity moves rearwardly such that the gravity generated torque moving the cab is increased. This increase in the torque causes an increase in the generated fluid pressure supplied to the latch mechanism. Thus, the increased fluid pressure moves the bolt 48 back to its non-latching position before the keeper 30 moves into the base keeper opening 44. After the cab has reached its lower use position with the keeper in the base keeper opening, the pressure of the fluid within the hydraulic cylinder lessens so that the bias of springs 76 and 78 moves bolt 48 back to its latching position. The keeper 30 is then secured to base 34 within its keeper opening 44 and thereby retains the cab in its lower use position. As is apparent from the above, the force which the springs 76 and 78 exert on the piston 72 must be selected properly in relationship to the force required to lift the cab to its access position. While two springs are disclosed in providing the proper force, it is of course possible to utilize a single spring of the proper spring rate instead.

As seen by combined reference to FIGS. 2 and 4, the keeper 30 and the keeper opening 44 in the base 34 each have tapered shapes such that the cab will always move into the proper use position even though it is slightly out of alignment when the lower end of the keeper first enters the upper side of the keeper opening. Keeper 30 has a generally pyramidal tapered shape and includes two closer spaced sides 104 (FIG. 2) and two sides 106 that are spaced further from each other than sides 104. The keeper opening 44 has a tapered shape with a frustopyramidal configuration that receives the pyramidal keeper and also has a lower portion 108 (FIG. 2) opening downwardly to the frame member 36 on which the base 34 is mounted. Keeper 30 has a slightly flattened shape due to the relative spacing between its sides 104 and 106. The bolt aperture 54 that receives the latch bolt 48 extends through the keeper between its two closer sides 104 such that the bolt passes through the thinner extent of the keeper in the latching position shown in FIG. 2.

As seen in FIG. 2, the latch bolt aperture 54 of the keeper and the latch bolt 48 have tapered shapes that are of a larger size moving from the left to the right. Consequently, even if the keeper does not move fully into the keeper opening 44 of the base as the cab is lowered, the biasing of the latch bolt by the cylinder springs causes a wedging action that wedges the keeper into position as the smaller end of the latch bolt first moves into and through the bolt aperture 54 and subsequently into the bolt opening 56 on the opposite side of the base from the bolt opening 52. The tapered shapes of the bolt apertures 54 and the latch bolt 48 of a frustoconical configuration (FIGS. 2 and 4) and the bolt opening 56 likewise has a frustoconical tapered shape to receive the smaller end of the latch bolt in its latching position.

As the piston 72 shown in FIG. 2 slides to the right and the left to move latch bolt 48 between its latching and nonlatching positions, a vent 110 at the right-hand end of the hydraulic cylinder exhausts and supplies environmental air to the cylinder bore 60 on the right-hand side of the piston. This vent is provided by a lower end 112 of the cylinder end wall 68 which is bent to receive a packing material 114 that prevents foreign particles from entering the cylinder bore. Holes 116 and 118 in the cylinder housing 56 and its end wall 68 respectively, communicate with the packing material 114 in providing a path of air flow for the vent.

Different materials may be utilized to construct the components of the latch mechanism 24 herein disclosed. Preferably, the keeper 30 and the base 34 are made from aluminum so as to be light weight but relatively strong. The cylinder housing 58 and the piston 72 are also made from aluminum with their sliding interfaces plated with a hard chrome to prevent wear. The latch bolt 48, the bolt openings 52 and 56 of the base, and the bolt aperture 54 of the keeper are also plated with hard chrome so as to prevent wear as the bolt moves between its latching and nonlatching positions into and out of engagement with the keeper. If the bolt 48 is of a different material than the keeper 30 and the base 34, it is preferable for the bolt to be covered by a corrosion resistant sleeve so that there is no engagement of dissimilar metals that could cause corrosion of these components of the latch mechanism.

While a preferred embodiment of the tilting cab latch mechanism has been herein described in detail, various embodiments and designs for practicing the present invention are possible as defined by the following claims.

I claim:

1. A latch mechanism for use with a tilting cab vehicle including a cab having a body member, a frame mounting the cab for tilting movement between access and use positions and having a frame member, said latch mechanism comprising: a keeper adapted to be mounted on one of said members; a base adapted to be mounted on the other of said members and defining a keeper opening for receiving the keeper when the cab is moved to the use position; a bolt movable on the base between latching and non-latching positions so as to engage or disengage the keeper in a manner that latches the cab in the use position or allows movement thereof to the access position; a cylinder on the base defining a cylinder bore and including a piston sealingly slidable within the bore; said piston having a first side including a connecting rod portion extending therefrom and fixedly mounting the bolt; the piston having a second side that faces in the opposite direction as the first side and includes a depression extending within the piston toward the connecting rod portion thereof; a seal located intermediate the first and second sides of the piston so as to slidably seal with the cylinder; a helical spring having a first end seated by the cylinder and a second end seated within the depression in the second side of the piston so as to bias the piston in a direction that moves the bolt to the latching position; and a fluid port for selectively feeding fluid to the cylinder bore on the first side of the piston such that the piston slides against the bias of the spring to move the bolt to the nonlatching position and thereby releases the keeper to permit the cab to be moved to the access position.

2. A mechanism as claimed in claim 1 which includes a bolt aperture extending through the keeper and also includes bolt openings in the base in alignment with each other on opposite sides of the keeper opening so as to be aligned with the bolt aperture in the keeper when the cab is in the use position, the bolt being supported within the bolt openings and extending through the keepers aperture in the latching position so as to retain the keeper within the keeper opening of the base, and the bolt being moved out of one of the bolt openings in the base and out of the bolt aperture in the keeper upon movement to the nonlatching position by the cylinder so as to release the keeper to allow cab movement to the raised position.

3. A mechanism as claimed in claim 2 wherein the bolt has a tapered shape and the bolt aperture in the keeper also has a tapered shape such that movement of the bolt to the latching position wedges the keeper in position with respect to the base.

4. A mechanism as claimed in claim 3 wherein the tapered shapes of the bolt and the keeper aperture are frustoconical.

5. A mechanism as claimed in claim 2 wherein the keeper has a tapered shape and the keeper opening in the base likewise has a complementary tapered shape so as to align the bolt openings of the base and the bolt aperture of the keeper as the keeper moves into the keeper opening of the base.

6. A mechanism as claimed in claim 5 wherein the keeper has four sides that taper in a generally pyramidal fashion.

7. A mechanism as claimed in claim 6 wherein the keeper has two sides that are closer to each other than the other two sides so as to have a flattened configuration, and the bolt aperture of the keeper extending through the keeper between the two closer sides thereof so that the bolt passes through the thinner extent of the keeper in the latching position.

8. A mechanism as claimed in claim 5 wherein the keeper includes a plate-like mounting portion adapted to be mounted on the cab member and the base includes a plate-like mounting portion adapted to be mounted on the frame member.

9. A mechanism as claimed in claim 8 wherein each of the mounting portions includes elongated bolt holes, the bolt holes of the keeper mounting portion being elongated in a first direction, and the bolt holes of the base mounting portion being elongated in a second direction perpendicular to the first direction so as to facilitate alignment of the keeper and the base during mounting.

10. A mechanism as claimed in claim 1 wherein the piston rod connecting portion is integral with the bolt.

11. A mechanism as claimed in claim 1 wherein the cylinder includes a vent that communicates the cylinder bore on the second side of the piston with the environment.

12. A latch mechanism for use with a tilting cab vehicle including a cab having a body member, a frame mounting the cab for tilting movement between access and use positions and having a frame member, said latch mechanism comprising: a keeper adapted to be mounted on one of said members; a base adapted to be mounted on the other of said members and defining a keeper opening for receiving the keeper when the cab is moved to the use position; a bolt movable on the base between latching and nonlatching positions so as to engage or disengage the keeper in a manner that latches the cab in the use position or allows movement thereof to the access position; a cylinder on the base defining a cylinder bore and including a piston sealingly slidable within the bore; said piston having a first side including a connecting rod portion extending therefrom and fixedly mounting the bolt; the piston having a second side that faces in the opposite direction as the first side; the second side of the piston defining a depression within the connecting rod portion of the piston; a seal located intermediate the first and second sides of the piston so as to slidably seal with the cylinder; a helical spring having a first end seated by the cylinder and a second end received within the depression of the piston so as to bias the piston in a direction that moves the bolt to the latching position; and a fluid port for selectively feeding fluid to the cylinder bore on the first side of the piston such that the piston slides against the bias of the spring means to move the bolt to the nonlatching position and thereby releases the keeper to permit the cab to be moved to the access position.

13. A mechanism as claimed in claim 12 wherein the cylinder includes a second helical spring received within the other helical spring, the second helical spring including a first end seated against the cylinder and a second end received within the depression in the second side of the piston, and the depression in the piston including a reduced end portion that seats the second end of the second helical spring.

14. A latch mechanism for use with a tilting cab vehicle including a cab mounted on a frame for tilting movement between access and use positions, said latch mechanism comprising: a tapered keeper including an integral mounting portion adapted to be mounted on the cab; said keeper including a bolt aperture extending therethrough and having a tapered shape; a base including a mounting portion adapted to be mounted on the frame and defining a tapered keeper opening for receiving the keeper upon movement of the cab to the use position; said base including bolt openings that are aligned with each other on opposite sides of the keeper opening and with the bolt aperture of the keeper as the keeper moves into the keeper opening; a tapered bolt movable between a nonlatching position within one of the bolt openings of the base and a latching position extending through the tapered bolt aperture of the keeper into the other bolt opening of the base so as to wedge the keeper into position on the base; a hydraulic cylinder on the base defining a cylinder bore and including a piston sealingly slidable within the bore; said piston including a first side having a connecting rod portion on which the tapered bolt is fixedly supported and a second side facing in the opposite direction as the first side within the cylinder bore; the second side of the piston having a depression that extends into the connecting rod portion thereof; a seal on the piston intermediate the first and second sides thereof in sliding engagement with the cylinder; a helical spring having a first end seated against the cylinder and a second end seated within the depression in the second side of the piston so as to bias the piston in a direction that moves the bolt to the latching position; and a fluid port for selectively feeding hydraulic fluid to the cylinder bore on the first side of the piston such that the piston slides against the bias of the spring to move the bolt to the nonlatching position and thereby releases the keeper to permit the cab to be moved to the access position.

15. In a vehicle including a frame, a cab mounted on the frame for tilting movement between access and use positions, a hydraulic actuator for moving the cab from the use position to the access position, and a pump for selectively supplying hydraulic fluid to the actuator such that the cab is moved from its use position to the access position when the fluid is of a predetermined pressure, a latch mechanism for securing the cab in the use position comprising: a tapered keeper including a mounting portion secured to the cab; said keeper including a bolt aperture extending therethrough and having a tapered shape; a base including a mounting portion adapted to be mounted on the frame and defining a tapered keeper opening for receiving the keeper upon movement of the cab to the use position; said base including bolt openings that are aligned with each other on opposite sides of the keeper opening and with the bolt aperture of the keeper as the keeper moves into the keeper opening; a tapered bolt movable between a nonlatching position within one of the bolt openings to a latching position extending through the tapered bolt aperture of the keeper into the other bolt opening of the base so as to wedge the keeper into position on the base; a hydraulic cylinder on the base defining a cylinder bore and including a piston sealingly slidable within the bore; said piston including a first side including a connecting rod portion on which the bolt is fixedly supported and a second side facing in the opposite direction as the first side within the cylinder bore; helical spring means seated against the cylinder and the second side of the piston so as to bias the piston in a direction that moves the bolt to the latching position; and a fluid port for feeding hydraulic fluid to the cylinder bore from the pump when the pump supplies fluid to the actuator to move the cab from the use position to the access position, said helical spring means having a bias less than the bias of the hydraulic fluid acting on the first side of the piston with the predetermined pressure necessary for the actuator to move the cab from the use position to the access position such that the piston slides within the bore to move the bolt to the nonlatching position and thereby automatically unlatches the cab prior to the cab movement caused by the actuator.

* * * * *